(12) United States Patent
Os et al.

(10) Patent No.: US 6,480,304 B1
(45) Date of Patent: Nov. 12, 2002

(54) SCANNING SYSTEM AND METHOD (75) Inventors: Ron Van Os, Sunnyvale, CA (US); Jay W. Hanson, Woodside, CA (US); Rudolph E. Burger, Woodside, CA (US)

(73) Assignee: Scansoft, Inc., Peabody, MA (US)

( * ) Notice: Subject to any disclaimer, the term of this patent is extended or adjusted under 35 U.S.C. 154(b) by 0 days.

(21) Appl. No.: 09/208,205

(22) Filed: Dec. 9, 1998

(51) Int. Cl.[7] .................................................. H04N 1/04

(52) U.S. Cl. ...................................... 358/474; 358/442

(58) Field of Search ................................ 358/442, 468, 358/400, 474, 505, 500, 409, 434

(56) References Cited

U.S. PATENT DOCUMENTS

| 5,499,108 A |   | 3/1996 | Cotte et al. ................. 358/400 |
| 5,517,332 A |   | 5/1996 | Barry et al. ................. 358/496 |
| 5,596,753 A | * | 1/1997 | Bhatt ......................... 709/320 |
| 5,911,044 A | * | 6/1999 | Lo et al. ..................... 709/203 |
| 5,915,106 A | * | 6/1999 | Ard ............................. 703/23 |
| 6,036,094 A | * | 3/2000 | Goldman et al. ......... 235/462.45 |

OTHER PUBLICATIONS

U.S. Patent Application Publication. Pub. No.: US 2001/0014908 A1 Lo et al., Network Image Scanning System which Transmits Image Information From A scanner over a Network to a client computer, Pub. Date: Aug. 16, 2001.*
U.S. Patent Application Publication, Pub. No.: US 2001/0014908 A1–6256–662 Lo et al., Network Image Scanning System which Transmits Image Information From a scanner over a network to a client computer, Pub. Date: Jul. 3, 2001.*

* cited by examiner

Primary Examiner—Cheukfan Lee
(74) Attorney, Agent, or Firm—Blakely, Sokoloff, Taylor & Zafman (57) ABSTRACT

A method and apparatus for scanning a document which utilizes scanning hardware and associated software to automate the entire scanning process. The software analyzes a host computer and automatically maps user interface buttons of a scanner with application programs installed on the host computer. The software also establishes appropriate pre-defined scan configurations for each application program mapped to the user-interface buttons. When one of the user-interface buttons is pressed, the scanning process is invoked to generate a scanned image of a document. The scanned image is automatically delivered to the application program mapped to the pressed button and is generated with an image type and resolution according to the pre-defined scan configuration established for the application program mapped to the pressed button.

24 Claims, 7 Drawing Sheets

SCANNING SYSTEM AND METHOD

FIELD OF THE INVENTION

The present invention relates to the field of digital scanning systems, and more particularly to a system and method for installing, configuring and operating a digital scanner.

BACKGROUND OF THE INVENTION

Digital scanners are commonly used to digitize documents for use in home and office computer systems. Although the physical characteristics of scanners vary, the initial setup and basic operation of many scanners is essentially the same. Initially, the user connects the scanner to a computer and installs scanner software that is provided with the scanner on one or more diskettes. The user then launches the scanner software, for example, by clicking an icon that represents the scanner software, by typing a command to invoke the software or, in some scanners, by presenting a document to be scanned to the scan head where the document is sensed and the scanning device signals the computer to invoke the scanner software.

Many popular imaging and document processing software applications are equipped with a TWAIN interface capable of interacting with a TWAIN data source supplied by a hardware vendor. Through selection of the appropriate data source and invocation thereof, a user is able to scan an image directly into a target application program.

When executed, the scanner software typically prompts the user to indicate the type of document to scan (e.g., text or picture). After the user indicates the type of document to scan, the user is then prompted to enter scan parameters for the scanning operation. For example, if a picture is to be scanned, the user is usually prompted to indicate whether the picture is a color image, shaded image (i.e., a grayscale image) or a purely black and white image (sometimes called a line drawing). The user may also be prompted to indicate a desired resolution for the scanned image. If a text scan is indicated by the user, the user may be prompted to enter scan parameters such as the size and quality of the text, whether to maintain the scanned text in columns and so forth.

Ergo, for many scanning devices, the user needs to complete a series of tasks to be able to achieve the goal of acquiring an image. Using at least one embodiment of the present invention, a user may achieve the acquisition of an image by simply hooking up scanner hardware, installing scanner software and pressing a button intuitively placed on the scanner itself.

SUMMARY OF THE INVENTION

A method and apparatus for scanning a document are disclosed. A request is received to generate a digitized representation of a document. Previously stored configuration information is inspected to identify an application program associated with the request and a scan setting associated with the application program. The digitized representation of the document is generated according to the scan setting.

Other features and advantages of the invention will be apparent from the accompanying drawings and from the detailed description that follows below.

DESCRIPTION OF THE DRAWINGS

The present invention is illustrated by way of example and not limitation in the figures of the accompanying drawings in which like references indicate similar elements and in which.

DESCRIPTION

A method and apparatus for acquiring a document are disclosed. The method and apparatus deliver simplicity of the scan experience to the end user by extensive pre-configuration management of the hardware to support simple user requests, such as requests to print, fax, copy and scan a document. This and other features and intended advantages are described below.

Figure 1:
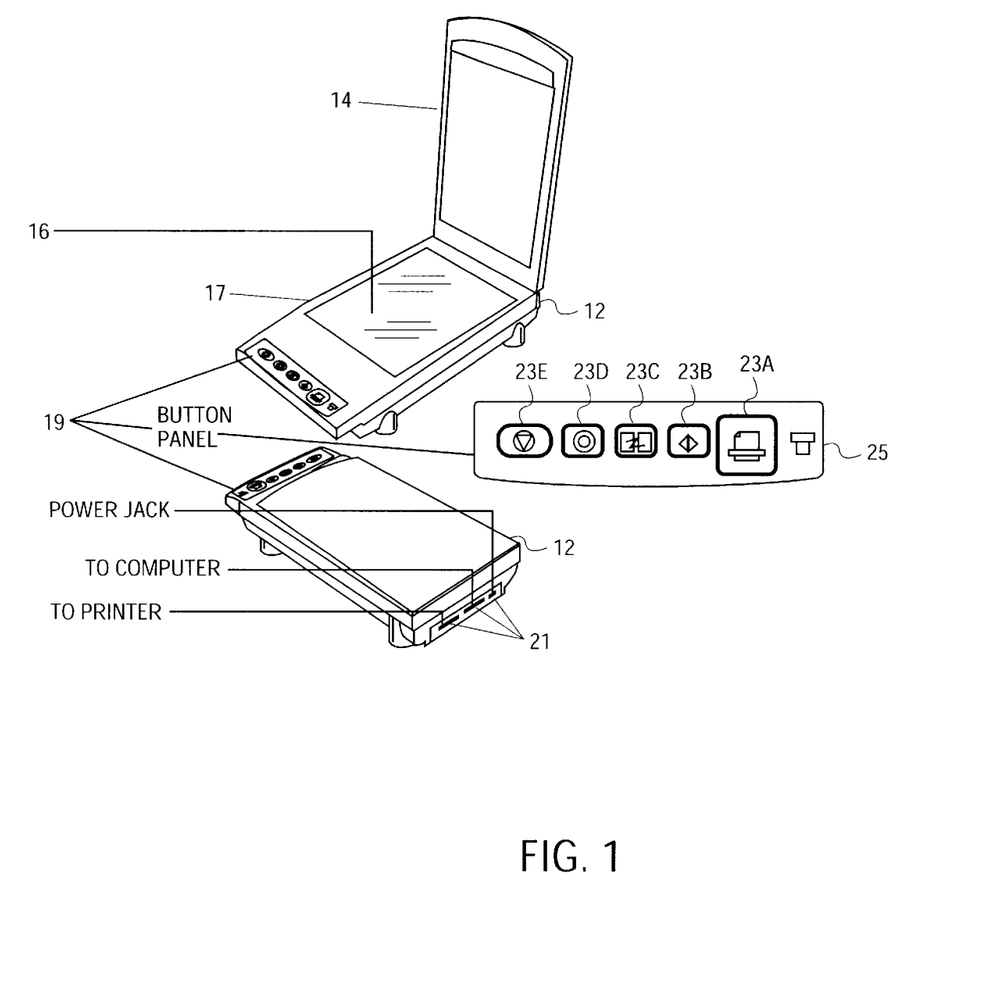
FIG. 1 depicts a scanner according to one embodiment.

FIG. 1 depicts a scanner 12 according to one embodiment. The scanner 12 includes a document cover 14, a scanning surface 16 (glass in a preferred embodiment), and a frame 17 that includes a button panel 19. A side of the scanner 12 includes ports 21 for connecting the scanner to power, a host computer and a printer. When a document is placed on the scanning surface 16 and a scan operation is initiated, a scan head inside the scanner 12 is moved across the scanning surface to detect color and shading variations in the document on the scanning surface. In an alternate embodiment, a document feeder may be used to move the document across a stationary scan head. In either case, the color and shading variations in the document are digitized to produce a bit mapped image of the document. This digitized representation of the original document is referred to herein as a "scanned image."

In one embodiment, the button panel 19 includes five buttons and a power indicator 25. The buttons may be mechanical or sensory type buttons (e.g., of the type commonly used on touch sensitive panels) and include a Scan button 23A, a Copy/Print button 23B, a Fax button 23C, a Custom button 23D and a Stop/Cancel button 23E. Each of the buttons, or a region of the button panel 19 adjacent each of the buttons, is silk-screened, embossed or otherwise marked with a descriptive text label and an icon representative of function that the button performs. In an alternate embodiment, there may be more or fewer scanner buttons and the scanner buttons may be placed in different locations. Also, the scanner buttons may alternatively be represented by user-interface elements on a computer display instead of being placed on the scanner.

The Scan, Fax, Copy/Print and Custom buttons (23A–23D) are each used to initiate a scan operation and are distinguished from one another by their association with respective hardware devices or software applications. For example, in one embodiment, when the Copy/Print button 23B is pressed, a scan operation is initiated to produce a scanned image which is then automatically routed to an attached printer for printing. Thus, the Copy/Print button 23B is pressed to start a document copy operation. The Fax button 23C is pressed to start a similar operation, except that the scanned image is routed to a fax application in the host computer rather than to a printer. The fax application, if present, transmits the scanned image to a remote receiver. The Scan button 23A, when pressed, initiates a scan operation to produce a scanned image of a document which is then delivered to an application program that has previously been associated with the Scan button 23A. Herein, the expression "application program" refers to an identifiable unit of program code that can be loaded into the memory of a computer and executed. The manner in which buttons and application programs become associated is discussed below. The Custom button 23D works like the Scan button 23A, except that the scanned image is delivered to an application program associated with the Custom button 23D instead of the application program associated with the Scan button 23A. As discussed below, the user is permitted to configure the Scan and Custom buttons 23A, 23D to deliver the scanned image to application programs of his or her choice. Copy/Print and Fax buttons 23B and 23C may also be configured to deliver the scanned image to a selected printer or fax application program. The Stop/Cancel button 23E is used to stop scan operations initiated by pressing other buttons on the button panel 19.

After the user connects the scanner 12 to a host computer and a power source (and optionally to a printer), and initiates installation of software that is provided with the scanner on one or more computer-readable media (e.g., magnetic or optical disks), the scanner software is executed by the host computer to automatically configure the operation of the scanner 12 in a manner that requires significantly less user assistance than with prior art scanning systems.

Figure 2:
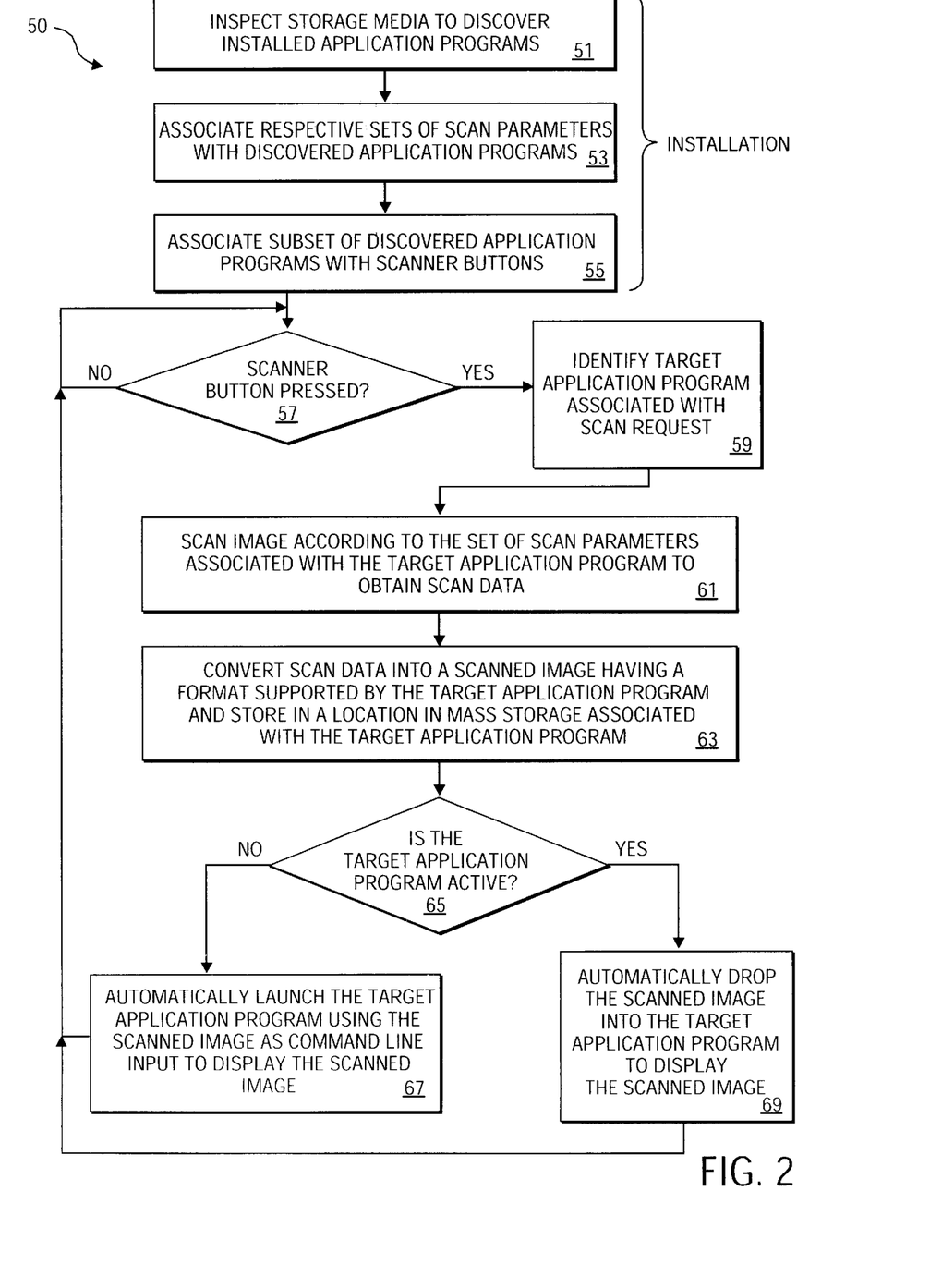
FIG. 2 is a flow diagram according to one embodiment that illustrates the setup and operation of the scanner of FIG. 1.

FIG. 2 is a flow diagram 50 that illustrates the setup and operation of the scanner 12 of FIG. 1 according to one embodiment. Initially, an installation program included in the scanner software is executed to install the components of the scanner software at appropriate storage locations in the host computer and to modify the host computer's configuration to accommodate the scanner. In one embodiment, the scanner software includes a device driver that is loaded into memory and that is automatically invoked by the host computer's operating system in response to certain detectable events, including receipt of a signal from the scanner indicating that a button on the scanner has been pressed.

At block 51 of diagram 50, the scanner software is executed to automatically discover application programs in the host computer to which scanned images may be delivered and a respective set of scan parameters is associated with each discovered application program at block 53. In one embodiment, the scanner software includes a parameter database that includes the names or other identifying information of a predetermined set application programs along with a respective set of scan parameters for each application program in the database. The set of scan parameters for a given application program is predetermined according to the usage characteristics for the application program. For example, the set of scan parameters associated with a word processing application may specify that a black/white scan is to be performed followed by optical character recognition (OCR) on the scanned image to generate a text file that can be edited using the word processing application. The set of scan parameters may also specify a file format that is recognized by the word processing application and a command line format for invoking the word processing application if the application is not already being executed at the time the document scan is performed. As another example, the set of scan parameters associated with an image editing application may specify that a color scan is to be performed at a resolution according to the file management capabilities of the image editing application (higher resolution scan operations produce larger documents which may or may not be manageable by a given image editing application). The set of scan parameters may also specify a file format that is recognized by the image editing application and a command line format for invoking the image editing application if the application is not already being executed at the time the scan is performed. In one embodiment, a generic scan parameter set is associated with each discovered application program that does not match any of the application programs listed in the database provided with the scanner software. As discussed below, the scan parameter set associated with a given application program can be modified by the user so that any default scan parameters can be overridden by the user at a later time.

At block 55, after associating scan parameters with the discovered application programs, a subset of the discovered application programs are associated with the scan-initiating buttons on the scanner (i.e., the scanner software is executed to automatically associate a predetermined one of the discovered application programs with each of the scan-initiating buttons of the scanner). Scan-initiating buttons are the buttons that, when pressed, cause a scan operation to be performed. In the exemplary scanner 12 of FIG. 1, the scan-initiating buttons include the Scan, Copy/Print, Fax and Custom buttons.

In one embodiment, the application program to be associated with a given scanner button is predetermined according to the likelihood or fore-knowledge that the application will be resident on the host computer. For example, most computers are shipped with a relatively primitive word processing application referred to herein as a "notepad." In one embodiment, presence of the notepad application is confirmed in block 51 and the notepad application is associated with the Custom button of the scanner in block 55. If the notepad application is determined not to be installed in the host computer in block 51, then a second choice predetermined application program is associated with the Custom button in block 55. In either case, execution of the scanner software has the effect of associating a predetermined application program, and therefore a default set of scan parameters, with the Custom button. In one embodiment, a hierarchy of choices of predetermined application programs to associate with the Custom button is provided with the scanner software and, if none of the predetermined applications in the hierarchy is found in the user's computer, the user is prompted to specify an application program to associate with the Custom button.

Each of the other scan-initiating buttons are similarly associated an application program (or device driver) and therefore with a set of scan parameters. In one embodiment, the Scan button is automatically associated with a document management application program provided with the scanner. In an alternate embodiment, the Scan button is automatically associated with the application program that is one choice below (or above) the application program associated with the Custom button in the hierarchy of choices of predetermined application programs. In another alternate embodiment, the Scan button is automatically associated with an application program according to the nature of the application program associated with the Custom button. For example, if the application program associated with the Custom button is a word processing application or other application program having a default set of scan parameters that specifies a text scan, then an application program having a default set of scan parameters that specifies a picture scan is associated with the Scan button. In yet another alternate embodiment, the same predetermined application program may be associated with both the Scan and Custom buttons.

The Fax button is configured similarly to the Scan and Custom buttons, except that the Fax button is associated with a facsimile application program. In many operating systems a device driver that includes a standardized configuration field is used to support facsimile functions. In one embodiment, the scanner software is executed during initial installation to locate the device driver for the facsimile application program and to inspect the configuration field to automatically determine the appropriate set of scan parameters to be associated with the Fax button. For example, the fax configuration field may specify the resolution of the image to be faxed according to a user-specified setting (e.g., draft, standard or fine resolution). A scan resolution parameter in the set of scan parameters associated with the Fax button may be set accordingly.

In one embodiment, the Copy/Print button is configured similarly to Fax button, except that the scanner software is executed to locate the device driver for a printer and to inspect a configuration field associated with the device driver to automatically determine the appropriate set of scan parameters to be associated with the Copy/Print button. For example, if the configuration field indicates that the printer is a color printer, then a color scan is specified in the set of scan parameters. Otherwise, a grayscale or black/white scan is specified in the set of scan parameters. The resolution of the scan may also be specified in the scan parameter set according to the print resolution of the printer (usually specified in dots-per-inch (DPI)).

As indicated in FIG. 2, blocks 51, 53 and 55 of the flow diagram 50 represent installation of the scanning software and, prior to block 57, nothing has been required of the user other than to connect the scanner and install the scanner software. In one embodiment, the operations performed in blocks 51, 53 and 55 may be automatically repeated by the scanner software in response to a triggering event such as detecting that a predetermined period of time has elapsed or detecting installation of a new application program or removal of an existing application program. In some computer systems, it may be necessary to restart the computer after step 55 is completed.

In one embodiment, the scanner software loops at block 57 until a 20 scanner button is pressed. A button press detected at block 57 constitutes a scan request, and at block 59 a target application program associated with the scan request is identified. At block 61, the document present on the scan surface (or fed by a feeder) is scanned according to the set of scan parameters associated with the target application program to generate raw scan data. At block 63, the raw scan data is converted to a format supported by the target application program and is saved in a file format and mass storage location associated with the identified application program. At decision block 65, the operating system is queried to determine whether the identified application program is already active (i.e., whether a process has been instantiated to execute the application program). If so, the file containing the scanned image is dropped into a display of the identified application program using object linking and embedding techniques or another data delivery technique at block 69. If the identified application program is not determined to be active at decision block 65, then the identified application program is launched at block 67 using the file containing the scanned image as a command line input. Regardless of whether block 67 or 69 is executed, the effect is to present the scanned image in a display generated by the identified application program. After block 67 or 69 is completed, execution loops back to block 57. As discussed above, the scanner buttons may be placed in a different location than on the scanner and may be presented in the form of a user-interface on a display of the computer system.

At this point it is worthwhile to reflect on what is achieved by the above-described scanning system. Although the user has done no more than connect the scanner and install the scanner software, the user need merely press a button to cause a document to be scanned and to cause the scanned image to be presented in an application program. In contrast to prior art techniques, the user has not been required to answer questions regarding document type, scan parameters, file format, file location and so forth before obtaining a scanned image. Instead, the user is quickly assured that the scanner works and is presented with a scanned image in the familiar setting of an application program that was already installed in the user's computer.

Figure 3:
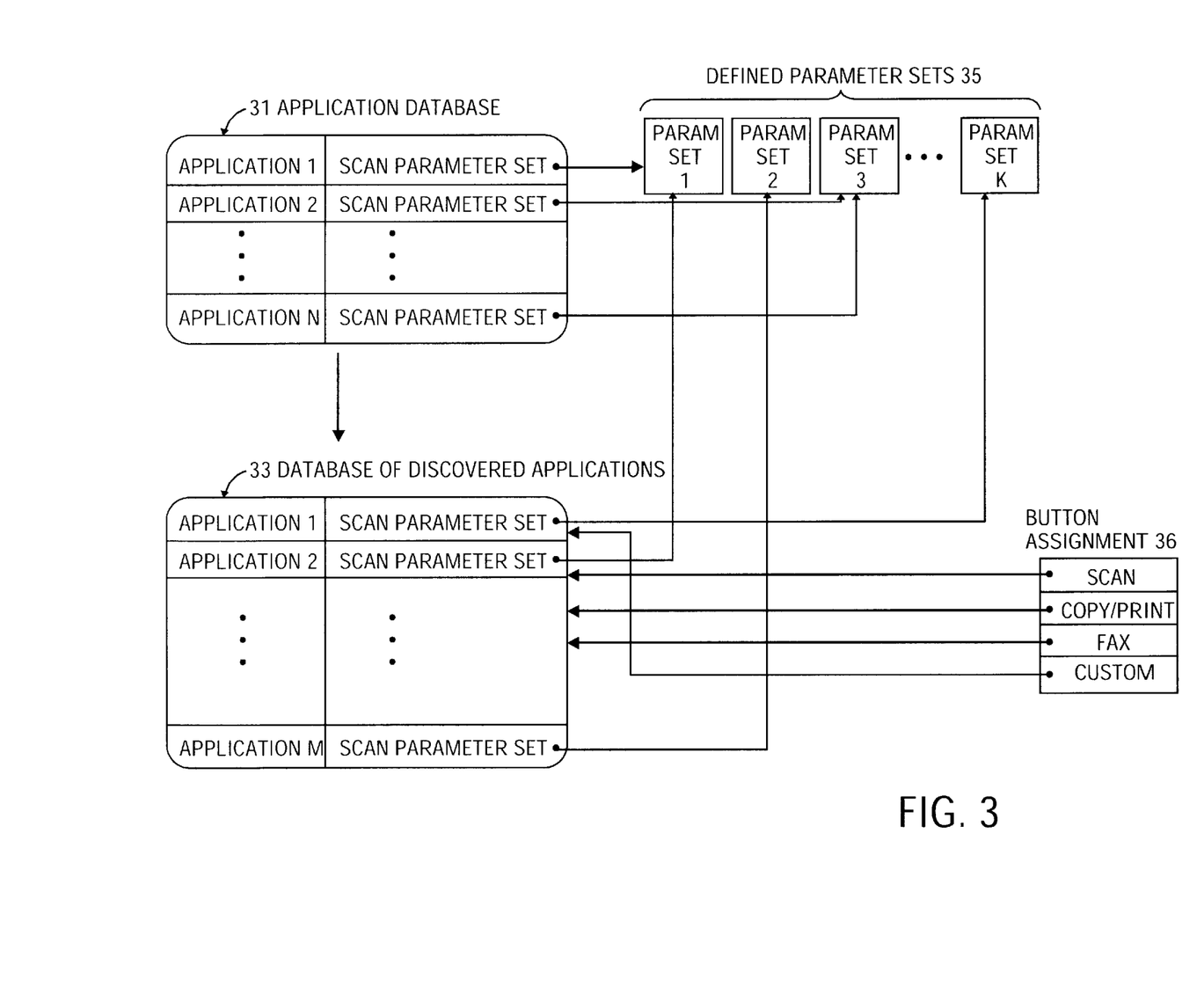
FIG. 3 illustrates construction of a database of discovered applications 33 according to one embodiment.

FIG. 3 illustrates construction of a database of discovered applications 33 according to one embodiment. As mentioned, the scanner software includes an application database 31 that includes a list of known application programs (e.g., applications 1,2, . . . N) along with respective sets of scan parameters. In one embodiment, defined sets of scan parameters are maintained in a separate data structure 35 (e.g., a linked list or other extendible data structure) and each application program listed in the application database 31 is associated with a respective set of parameters by a pointer or other link. Consequently, a single set of parameters may be pointed to by multiple entries in the application database 31. For example, application 2 and application N in database 31 are both associated with parameter set 3, and application 1 in data base 31 and application 2 in the database of discovered applications 33 are both associated with parameter set 1. Maintaining sets of scan parameters in a separate data structure also permits the existence of parameter sets that are not associated with any of the application programs listed in the application database 31 or the database of discovered applications 33. This is desirable because a user may wish to associate a given application program with different sets of parameters at given times. For example, the user may wish to associate application 1 in database 33 with parameter set K for certain scanning operations, but with a different parameter set for other scanning operations. Because the different sets of parameters may be defined and maintained in the define parameter set data structure 35, the user may simply select between the parameter sets using an appropriate interface. A one-to-one correspondence may be established between application programs in database 31 or 33 and parameter sets in the defined sets of parameters in an alternate embodiment.

According to one embodiment, the database of discovered applications 33 that lists application programs 1,2, . . . M is constructed by comparing application programs discovered in the host computer system against the application programs listed in the application database 31. If a match is found, the entry from the application database 31 is copied into the database of discovered applications 33. As discussed below, the parameter set associated with an application program in the database of discovered applications 33 may be modified by the user at a later time.

Still referring to FIG. 3, a button assignment data structure 36 is used to associate application programs in the database 33 with the buttons of the scanner. In one embodiment, the button assignment data structure 36 includes respective pointers to entries in the database 33. For example, an entry in the data structure 36 that corresponds to the Scan button contains a pointer to application 2 in the database 33. Pointers in entries of the data structure 36 that correspond to the Copy/Print, Fax and Custom buttons likewise point to respective entries in the database 33. The button assignment data structure 36 may include additional entries to handle additional scanner buttons in an alternate embodiment.

Figure 4:
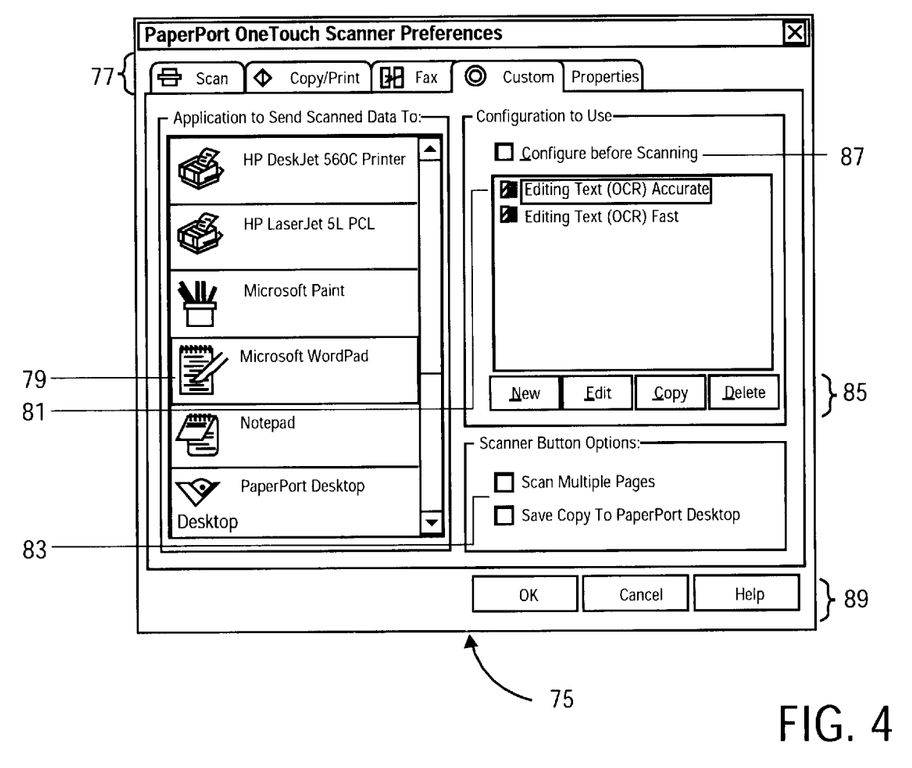
FIG. 4 illustrates a scanner preference interface that can be used to associate a different application program with a scan-initiating button or to change the default scan settings associated with an application program.

FIG. 4 illustrates a scanner preference interface 75 that can be used to associate a different application program with a scan-initiating button or to change the default scan settings associated with an application program. In one embodiment, the user invokes the scanner preference interface 75 by pressing and holding down a scan-initiating button. In response to detecting that a scan-initiating button is held down, the scanner software is executed to present the scanner preference interface 75 on a display of the host computer.

In one embodiment, the scanner preference interface 75 includes separate button tabs 77 for each of the scan-initiating buttons (Scan, Copy/Print, Fax and Custom) as well as a Properties tab. Each of the button tabs 77 may be selected by a user (e.g., clicked using a mouse or similar cursor control device) to bring the settings of the corresponding button to the forefront of the scanner preference interface 75. In the exemplary display of FIG. 4, the Custom button has been pressed and held down so that the button tab that corresponds to the Custom button is presented in the forefront of the scanner preference interface 75.

In one embodiment, the scanner preference interface 75 for a given button tab includes three configuration windows: an application selection window 79, a parameter selection window 81 and a button option window 83. The application selection window 79 presents a scrollable list of the applications programs discovered by the scanner software. As shown in FIG. 4, one or more printers and fax application programs may also be presented as selectable entries in the application selection window 79. In one embodiment, the user associates an application with a given program by selecting (e.g., clicking) an application in the application selection window 79. By double-clicking an application program in the application selection window 79, the user is prompted to specify a storage location and a file format for scanned images delivered to the application program. In an alternate embodiment, a menu item or other screen element may be selected to open a dialog box for specifying the storage location and file format for scanned images delivered to a given application program.

When a user selects an application in the application window 79, the application program is associated with the scan button that corresponds to the active scan tab, and the name of a set of scan parameters that are associated with the application program is highlighted, or otherwise emphasized (e.g., displayed in reverse video) in the scan parameter selection window 81. In one embodiment, more than one set scan parameters may be specified, named and saved (e.g., in one or more files or other records) for a given application program. This allows a user to easily switch between commonly used sets of scan parameters for a given application program. Referring to FIG. 4, for example, two sets of scan parameters have been defined for the selected WordPad application: "Editing Text (OCR) Accurate" and "Editing Text (OCR) Fast." The parameter set named "Editing Text (OCR) Accurate" is initially shown in reverse video to indicate that it is the currently selected set of scan parameters. To switch to the "Editing Text (OCR) Fast" parameter set, the user selects the corresponding entry in the parameter selection window (for example, by clicking on the entry or scrolling down to the entry using arrow keys or other navigation keys and then pressing an enter key).

In one embodiment, the parameter selection window 79 includes New, Edit, Copy and Delete buttons 85. When the New button is selected by the user, the user is presented with an interface for specifying a new set of scan parameters and is prompted to enter a name for the new set of scan parameters to be added to the list presented in the parameter selection window 81. The Edit button works like the New button, except that the interface for specifying scan parameters is presented to edit a pre-existing set of scan parameters (e.g., the "Editing Text (OCR) Accurate" parameter set). The Copy button works like the New button, except that a selected set of scan parameters are copied into a new set of scan parameters. The Delete button is used to delete a set of scan parameters from the parameter selection window 81.

The button option window 83 in the scanner preference interface 75 includes options which, when selected, cause the scanner to scan multiple pages or to automatically save a copy of the scanned image to a desktop management application program. There is also an option 87 in the scanner preference interface 75 called "Configure before Scanning". When enabled, the Configure before Scanning option 87 causes the user to be prompted to enter scan configuration information (e.g., a set of scan parameters and an application program to deliver the scanned image to) in response to each button press.

As mentioned above, the button tabs 77 in the scanner preference interface 75 also include a Properties tab. In one embodiment, the Properties tab provides a list of additional options and settings for customizing the scanner and provides a link to a server computer that provides further information regarding scanner options and software upgrades. In one implementation, the link includes a uniform resource locator (URL) that identifies a server computer on the World Wide Web. Other types of links may also be used.

The scanner preference interface 75 also includes a set of OK, Cancel 10 and Help buttons 89 in the lower right corner. If the OK button is pressed, any of the settings entered using the scanner preference interface 75 are committed (i.e., used to overwrite pre-existing settings, if any). If the Cancel button is pressed, settings revert to their state prior to presentation of the scanner preference interface 75 and the scanner preference interface 75 is closed. If the Help button is pressed, context-sensitive help is displayed.

Figure 5:
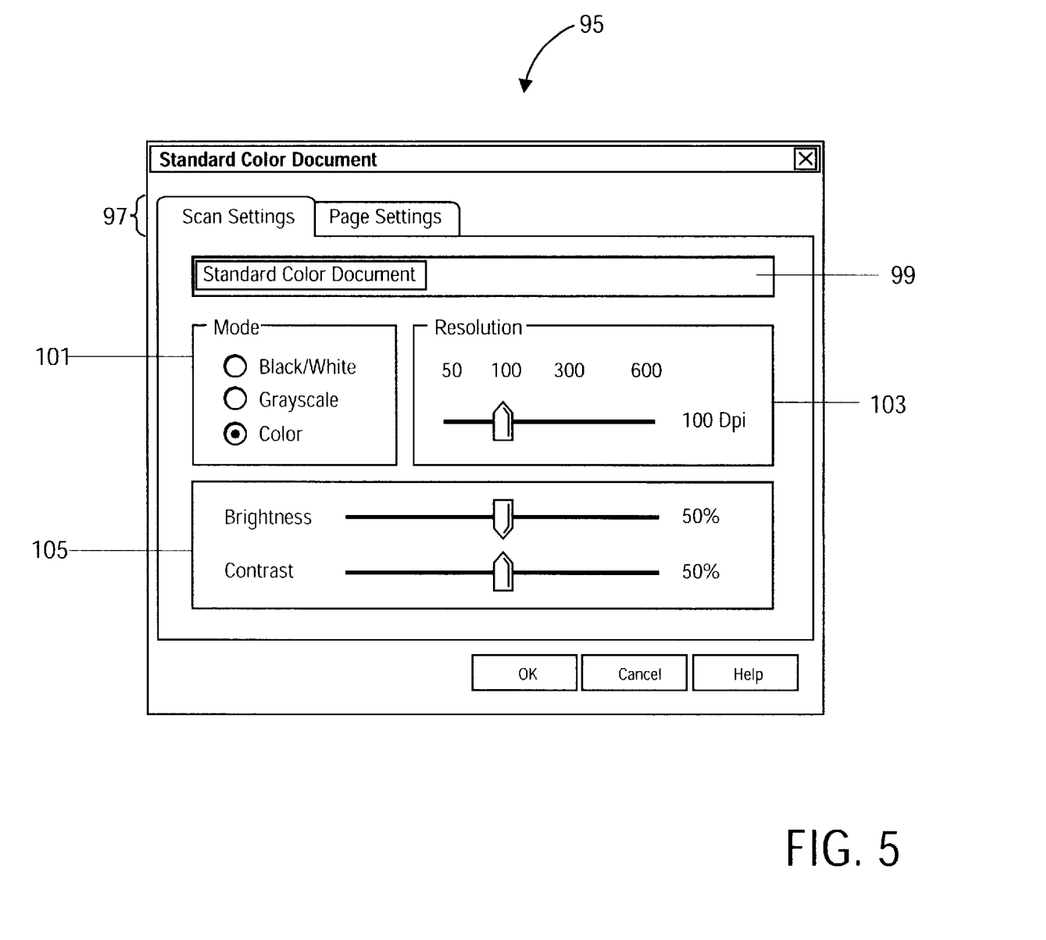
FIG. 5 illustrates an embodiment of an interface for specifying scan parameters.

FIG. 4 illustrates an embodiment of the interface 95 for specifying scan parameters that is presented when the New, Edit or Copy buttons 85 of FIG. 4 is selected. The interface 75 includes at least two user-selectable tabs 97: one for scan settings and one for page settings. If the Copy/Print or Fax button has been held down to edit or adjust scan settings, an additional Device tab is displayed for specifying print, copy and fax options.

The scan settings tab is displayed in the forefront of the interface 95 in FIG. 5. The scan settings tab includes a data entry window 99 to allow a user to type the name of a scan parameter set, a mode selection window 101 to allow a user to specify black/white, grayscale or color scan, a resolution window 103 to allow a user to specify the resolution of the scanned image, and a brightness and contrast control window 105 to allow a user to adjust the brightness and contrast of the scanned image. More or fewer scan settings may be provided in alternate embodiments and a variety of user-interface elements may used to enter scan settings instead of the slide bars, radio buttons and data entry window depicted in FIG. 5.

Figure 6:
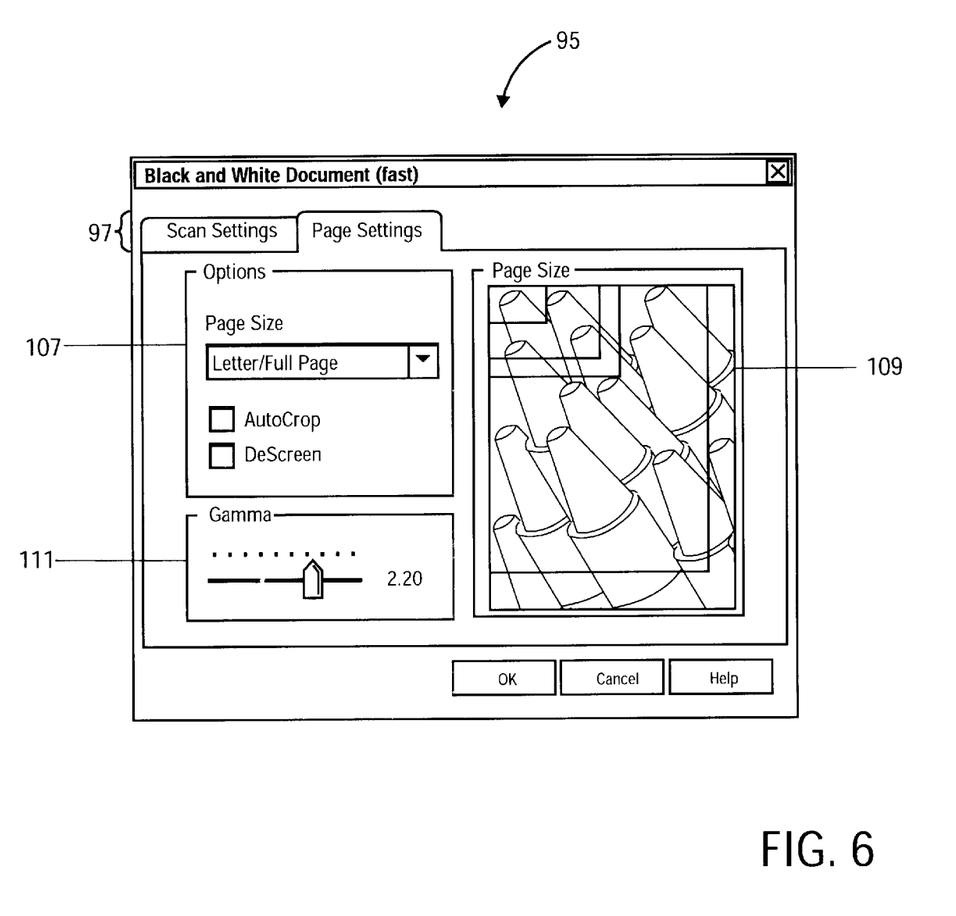
FIG. 6 illustrates the interface of FIG. 5, but with the page settings tab in the forefront of the interface instead of the scan settings tab.

FIG. 6 illustrates the interface 95 of FIG. 5, but with the page settings tab displayed in the forefront of the interface instead of the scan settings tab. In one embodiment, the page settings tab includes an options window 107 that allows the user to select one of a number of predetermined page sizes or to enter a custom page size. The page size is used to indicate the portion of the scanned image to be saved and delivered to the application program associated with the scan. The scanned image is displayed on a preview window 109 with a scaled page boundary of the selected page size overlaid on the scanned image. The overlaid scaled page boundary allows a user to quickly determine a desired page size for the scanned image. In an alternate embodiment, the user may be allowed to select and drag a side or corner of the scaled page boundary on the preview window to adjust the desired page size.

The options window 107 also includes selections for autocropping an image (AutoCrop) and for descreening an image (DeScreen). When the autocropping option is enabled, the page size is automatically fit to the page size of the scanned image. To automatically fit the page size to the size of the scanned image, the scanner makes two scans of the document. The first scan senses the size of the document and the second scan obtains the scanned image and crops the page size to match the image size. When the descreening option is enabled, the scanner compensates for patterns and dots in the document being scanned in an attempt to produce a clearer, less distorted image.

The page settings tab also includes a gamma adjustment window 111 to allow the user to adjust the emphasis of particular color or grayscale tones in an image. For example, increasing the gamma setting tends to bring out details in shadows or dark areas of a scanned image, while decreasing the gamma setting tends to produce better image quality in lighter or highlighted areas of the scanned image.

Figure 7:
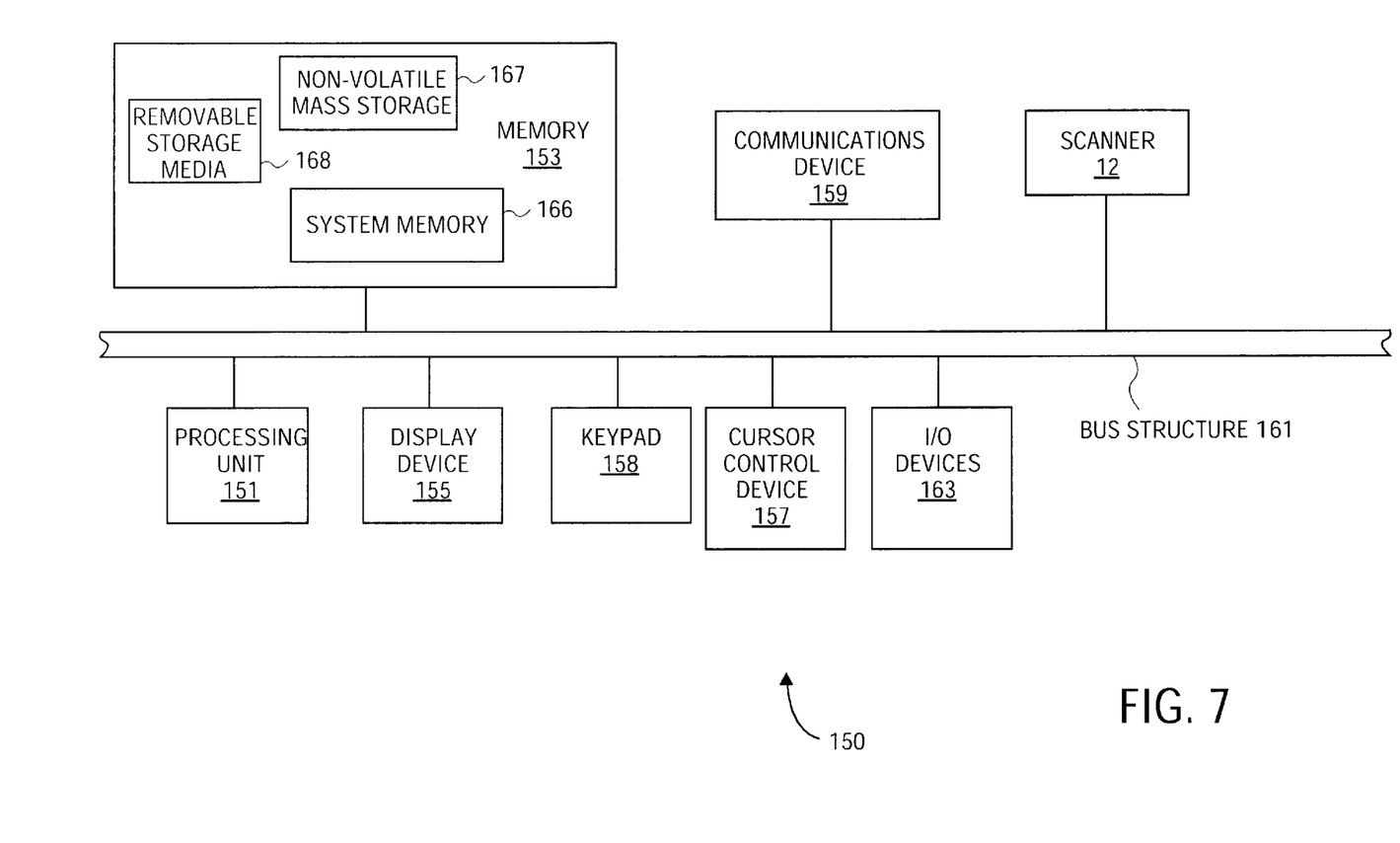
FIG. 7 is a block diagram of a computer system that can be used to perform processing operations used in embodiments of the present invention.

FIG. 7 is a block diagram of a computer system 150 that can be used to perform processing operations used in embodiments of the present invention. The computer system 150 includes a processing unit 151, memory 153, display device 155, cursor control device 157, keypad 158, scanner 12 and communications device 159 each coupled to a bus structure 161. The computer system 150 may be a desktop or laptop computer or a workstation or larger computer. Alternatively, the computer system 150 may be a personal data organizer, or other electronic device in which it is desirable to receive scanned documents. The cursor control device 157 may be a mouse, trackball, stylus, or any other device for manipulating elements displayed on display device 155. The keypad 158 may be a keyboard or other device to allow a user to input alphanumeric data into the computer system 150. Other I/O devices 163 may be present according to the specific functions performed by the computer system 150.

The processing unit 151 may include one or more general purpose processors, one or more digital signal processors or any other devices capable of executing a sequence of instructions. When programmed with instructions provided in the scanner software, the processing unit may be used to execute the above-described processing operations and to invoke and execute application programs associated with scan-initiating buttons The communications device 159 may be a modem, network card or any other device for coupling the computer system 150 to a computer network. The communications device may be used to generate or receive a signal that is propagated via a conductive or wireless medium. The propagated signal may be used, for example, for contacting sites on the World Wide Web (or any other network of computers) and for receiving updated program code or function-extending program code that can be executed by the processing unit to implement embodiments of the present invention.

In one embodiment, the memory 153 includes system memory 166, non-volatile mass storage 167 and removable storage media 168. The removable storage media may be, for example, a compact disk-read only memory (CDROM), floppy disk or other removable storage device. The scanner software described above, including the application database 31 of FIG. 3, may be stored on a removable storage media that can be read by the computer system 150 and used to operate the scanner 12 in accordance with embodiments described herein. The non-volatile mass storage 167 may be a device for storing information on any number of non-volatile storage media, including magnetic tape, magnetic disk, optical disk, electrically erasable programmable read only memory (EEPROM), or any other computer-readable media. Scanner software in the form of data and program code for controlling the operation of the scanner 12 may be transferred from the removable storage device 168 to the non-volatile mass storage 167 under control of an installation program as described above.

In one embodiment, when power is applied to the computer system 150, operating system program code is loaded from non-volatile mass storage 167 into system memory 166 by the processing unit 151 or another device, such as a direct memory access controller (not shown). Sequences of instructions comprised by the operating system are then executed by processing unit 151 to load other sequences of instructions, including the above-described application programs and scanner software, from non-volatile mass storage 167 into system memory 166. Thus, embodiments of the present invention may be implemented by obtaining sequences of instructions from a computer-readable medium, including the above-described propagated signal, and executing the sequences of instructions in the processing unit 151.

Having described a computer system for implementing embodiments of the present invention, it should be noted that the individual processing operations described above may also be performed by specific hardware components that contain hard-wired logic to carry out the recited operations or by any combination of programmed processing components and hard-wired logic. Nothing disclosed herein should be construed as limiting the present invention to a single embodiment wherein the recited operations are performed by a specific combination of hardware components.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A method comprising:
   receiving a request to generate a digitized representation of a document;
   inspecting previously stored configuration information to identify a target application program associated with the request and a scan setting associated with the target application program; and generating the digitized representation of the document according to the scan setting.

2. The method of claim 1 wherein the scan setting includes a parameter that indicates whether to generate a color representation of the document or a black and white representation of the document.

3. The method of claim 1 wherein the scan setting includes a parameter that indicates a resolution of the digitized representation.

4. The method of claim 1 wherein the one or more parameters included in the scan setting include a parameter to indicate whether to generate a text representation or a pixel-based representation of the document.

5. The method of claim 1 wherein the inspecting previously stored configuration information comprises inspecting a data structure that identifies the scan setting associated the target application program.

6. The method of claim 1 further comprising automatically displaying the digitized representation of the document in a display window generated by the target application program.

7. The method of claim 1 wherein the scan setting includes a parameter indicating a file format for storing the digitized representation of the document.

8. The method of claim 1 wherein the receiving a request to scan a document comprises receiving a signal indicating that one of a plurality of scan operations has been requested by a user.

9. The method of claim 1 wherein the receiving a request to generate a digitized representation of a document comprises detecting that one of a plurality of buttons on a scanning device has been pressed.

10. The method of claim 1 wherein the receiving a request to generate a digitized representation of a document comprises receiving a signal that the user has selected one of a plurality of scan operations indicated on a display of a computer.

11. A method of configuring operation of a scanner coupled to a host computer, the method comprising:

automatically discovering application programs installed on the host computer;

associating at least a first application program of the application programs with a user-input element that can be activated by a user to initiate a scan operation; and automatically associating a set of scan parameters with the first application program to indicate the scan parameters to be applied to scan a document when the user activates the user-input.

12. The method of claim 11 wherein the user-input element is a button on the scanner.

13. The method of claim 11 wherein the user-input element is an element on a display of the host computer.

14. The method of claim 11 wherein the automatically discovering application programs installed on the host computer comprises inspecting a mass storage device in the host computer to identify installed application programs that correspond to a previously generated database of application programs.

15. The method of claim 14 wherein the previously generated database of application programs comprises a data structure having names of application programs stored therein.

16. The method of claim 14 wherein the previously generated database of application programs indicates sets of scan parameters to be associated with the application programs installed on the host computer, and wherein automatically associating a set of scan parameters with the first application program comprises associating a set of scan parameters indicated by the previously generated database of application programs with the first application program.

17. A scanning system comprising:

a scanner; and a host computer that includes a processing unit and a mass storage device, the host computer being configured to automatically discover application programs stored on the mass storage device, associate at least a first application program of the application programs with a user-input element that can be activated by a user to initiate a scan operation, and automatically associate a set of scan parameters with the first application program to indicate the scan parameters to be applied to scan a document on the scanner when the user activates the user-input element.

18. A scanning system comprising:

a scanner; and a host computer that includes a processing unit and a memory, the host computer being configured to receive a request to generate a digitized representation of a document using the scanner, inspect configuration information previously stored in the memory to identify a target application program associated with the request and a scan setting associated with the target application program, and generate the digitized representation of the document using the scanner according to the scan setting.

19. An article of manufacture including one or more computer-readable media that embody a program of instructions for configuring operation of a scanner, wherein the program of instructions, when executed by a processor of a host computer, causes the processor to:

automatically discover application programs stored on the mass storage device;

associate at least a first application program of the application programs with a user-input element that can be activated by a user to initiate a scan operation; and automatically associate a set of scan parameters with the first application program to indicate the scan parameters to be applied to scan a document on the scanner when the user activates the user-input element.

20. The article of claim 19 wherein the one or more computer-readable media include one or more non-volatile storage devices.

21. The article of claim 19 wherein the one or more computer-readable media include a propagated data signal.

22. The article of claim 19 wherein the user-input element is a button on the scanner.

23. The article of claim 19 wherein the user-input element is an element on a display of the host computer.

24. An article of manufacture including one or more computer-readable media that embody a program of instructions for scanning a document, wherein the program of instructions, when executed by a processor, causes the processor to:

receive a request to scan a document;

inspect previously stored configuration information to identify a target application program associated with the request and a scan setting associated with the target application program; and scan the document according to the scan setting.

* * * * *